US007813852B2

(12) United States Patent
Kato et al.

(10) Patent No.: US 7,813,852 B2
(45) Date of Patent: Oct. 12, 2010

(54) SYSTEM MOUNTED ON A VEHICLE, VEHICLE, DIAGNOSIS INFORMATION COLLECTING DEVICE AND NAVIGATION DEVICE

(75) Inventors: Hiromitsu Kato, Yokohama (JP); Akitoshi Shimura, Yokohama (JP); Takeiki Aizono, Kokubunji (JP); Toshiyuki Sakamoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 429 days.

(21) Appl. No.: 11/779,371

(22) Filed: Jul. 18, 2007

(65) Prior Publication Data

US 2008/0021607 A1 Jan. 24, 2008

(30) Foreign Application Priority Data

Jul. 18, 2006 (JP) ............................ 2006-195055

(51) Int. Cl.
*G01M 17/00* (2006.01)

(52) U.S. Cl. ............................ 701/35; 701/29; 701/33; 701/36; 340/438

(58) Field of Classification Search .................. 701/29, 701/32, 33, 35, 36; 340/425.5, 438, 439
See application file for complete search history.

(56) References Cited

U.S. PATENT DOCUMENTS

2003/0050747 A1 * 3/2003 Kamiya ...................... 701/33

FOREIGN PATENT DOCUMENTS

| | | |
|---|---|---|
| EP | 1 376 882 | 1/2004 |
| JP | 2004-009878 | 1/2004 |

* cited by examiner

*Primary Examiner*—Gertrude Arthur Jeanglaud
(74) *Attorney, Agent, or Firm*—Antonelli, Terry, Stout & Kraus, LLP.

(57) ABSTRACT

In a navigation system integrated with a diagnostic device, an arithmetic and control unit for diagnostic communication makes an inquiry to electronic control units, such as an engine control unit, a transmission control unit and a brake control unit connected a CAN, about data which is used for the diagnosis of trouble causes based on setting information stored in a memory through diagnostic communication. An arithmetic and control unit for navigation system receives messages responding to the inquiry to sift through the data to be collected based on the setting information in the memory and stores the collected information in a hard disk drive device. The setting information is updated by making an inquiry to an external center via a mobile communication network.

29 Claims, 14 Drawing Sheets

FIG. 2

203

| UPDATE DATE AND TIME | 2006/01/10 13:45:28 |
|---|---|

201 SETTING INFORMATION

202

| SETTING ID | 0001 |
|---|---|

| SEQUENCE NUMBER | TRANSMISSION CAN ID | RECEPTION CAN ID | SERVICE ID | PARAMETER | PERIOD (msec) | PRIORITY LEVEL | TRIGGER CONDITION |
|---|---|---|---|---|---|---|---|
| 1 | 12A | 34B | 19 | 02FF | 10 | A | — |
| 2 | 56C | 78D | 22 | 01 | 10 | B | — |
| 3 | 90E | 12F | 23 | XXXXXXXX | 100 | B | >0 |
| 4 | — | 100 | — | — | — | B | — |
| ... | ... | ... | ... | ... | ... | ... | ... |

| PRE-TRIGGER TIME | 3sec |
|---|---|

SYSTEM MOUNTED ON A VEHICLE, VEHICLE, DIAGNOSIS INFORMATION COLLECTING DEVICE AND NAVIGATION DEVICE

CLAIM OF PRIORITY

The present invention claims priority from Japanese application serial No. 2006-195055 filed on Jul. 18, 2006, the content of which is hereby incorporated by reference into this application.

BACKGROUND OF THE INVENTION

The present invention relates to a system mounted on a vehicle for collecting and storing diagnostic information of mobile objects, such as vehicles, railway vehicles and aircrafts, in a highly reliable manner and at low costs.

Electronic control of vehicles has been developing while further improvement of safety performance and environmental performance of vehicles has been required. In the electronic control of vehicles, control information is transmitted and received between Electronic Control Units (ECUs) via a control network represented by a CAN (Controller Area Network) and control is performed in cooperation and in coordination among the ECUs.

In such a vehicle electronic control system, diagnostic information relating to irregularities and failures is stored in each ECU, and the stored diagnostic information is typically retrieved at maintenance sites of dealers or the like using a maintenance tool and is used for the analysis of problems or the like.

However, the amount of diagnostic information that can be stored in the ECUs is limited and context information such as timing of events, around the diagnostic information that took place at another ECU cannot be collected later. Therefore, only the diagnostic information collected by the maintenance tool has not been sufficient enough to help quickly grasp failure factors and solve problems.

As a remedy, vehicle diagnostic equipment has hitherto been proposed that continuously monitors and stores diagnostic information in a vehicle. In JP-A-2004-9878, for example, a vehicle navigation system is described that doubles as the vehicle diagnostic equipment, and collects data indicating states from an engine control computer or the like to accumulate and store the collected data in a memory at a predetermined period.

SUMMARY OF THE INVENTION

Such a background art suffers from the following problems.

The information each ECU transmits to the CAN is basically one that is required for control, and, typically, only limited information flows therein that is required for the diagnosis, such as a failure code. Therefore, it is impossible to collect necessary information just by monitoring the CAN.

The diagnostic information such as the failure code is retrieved by making an inquiry to the ECUs using a communication protocol for diagnosis. However, it is not preferable in this case from a standpoint of control safety that a vehicle-mounted information device, which is not sufficiently reliable, accesses a control based system.

Furthermore, even if the vehicle diagnostic equipment has the same level of reliability as the control based system, in the ECU type equipment, the diagnostic information is stored in a storage having a small capacity such as a flash memory, thus the long-term collection of detailed vehicle information being limited. Moreover, even if the same level of reliability as the control based system is requested to the vehicle-mounted information device such as the navigation system, development and manufacturing costs for related terminals will unnecessarily increase, resulting in exceeding the price appropriate for the inherent information equipment.

Meanwhile, in recent vehicle navigation systems, a storage medium comprised of a hard disk drive (HDD) has become dominant. This is appropriate for storing large volume of data at low costs.

It is an object of the present invention to provide vehicle-mounted information equipment, such as a vehicle navigation system, that has reliability comparable to that of the control based system, and collects and stores diagnostic information, and to provide a method therefor.

A system according to the present invention has a most prominent feature in comprising a highly reliable enough to satisfy specifications for in-vehicle environment (highly heat resistance, highly vibration resistance, and having a long life) diagnostic communication unit for performing diagnostic communication so as to collect the diagnostic information from the electronic control units connected to the control based network; an information collection unit for collecting the information flowing in the control based network; an information storage unit for storing the information collected by the information collection unit; and a shared storage unit for storing setting information which is required by the diagnostic communication unit and information collection unit in order to perform the diagnostic communication and information collection.

The present invention also has a feature that a vehicle-mounted system having a highly reliable diagnostic communication unit for performing diagnostic communication so as to collect the diagnostic information from the electronic control units connected to the control system network; a storage medium managed by the diagnostic communication unit; an information collection unit for collecting the information flowing in the control system network; and an information storage unit for storing the information collected by the information collection unit, further comprises a means of the information collection unit for making an inquiry to the diagnostic communication unit about an identifier of the setting information stored in the information storage unit; a means for comparing the inquired identifier of the setting information with an identifier of another setting information stored in the storage medium; and a means for transmitting the latest setting information to the information collection units when the setting information is updated.

The present invention also has a feature that the setting information has the identifier of the setting information as an attribute, and has at least one or more of a transmission ID, a reception ID, and an ID for identifying the means for obtaining diagnostic information, a period during which diagnostic communication is performed, an importance level of the information to be collected and a trigger evaluation condition.

The present invention also has a feature that an information collection managing unit has a means for communicating with an external information center; a means for reading the setting information from the shared storage unit or information storage unit; a means for detecting an event that communication with the center has been established; a means for making an inquiry to the center about identifier of the setting information; a means for receiving a message authenticating that it is latest when the setting information identifier is latest; and a means for receiving the latest setting information to update it when the setting information identifier is not latest.

The present invention also has a feature that the information collection unit has a means for receiving data having an identifier within a specified range out of the data flowing in the control system network; a means for temporarily recording the identifier as a first value; a means for temporarily recording the identifier of the data received within a limit time as a second value; a means for determining the identity of the first value and second value; a means for increasing a counter value when the two values differ; and a means for setting the first value to the transmission ID of the setting information and for setting the second value to the reception ID when the counter value reaches a predetermined value or more.

The present invention also has a feature that the information collection unit has a means for determining whether data having the same identifier as the transmission ID in the setting information out of the data flowing in the control system network is received within a specified time limit; a means for increasing the counter value when the data is received within the specified time limit; and a means for eliminating a record including the transmission ID from the setting information when the counter reaches the predetermined number or more.

The present invention also has a feature that the diagnostic communication unit has a means for transmitting a copy of collected information which is stored in the shared storage unit or storage medium to the information collection unit, and the information collection unit has a means for storing the received copy in the information storage unit.

The present invention also has a feature that the diagnostic communication unit has a means for transmitting a message notifying that a trigger has been established when the trigger evaluation condition has been established. The present invention also has a feature that the information collection unit has a means for receiving the trigger establishment message; and a means for using the reception of the trigger establishment message as a trigger to store information collected prior to and subsequent to the reception of the trigger establishment message.

The present invention enables the reliable diagnostic communication apparatus to perform diagnostic communication, and enables the vehicle-mounted system having a large storage capacity to collect and store necessary data while sifting through them. Thus, the present invention has an advantage in its ability to store large-capacity vehicle diagnostic information while maintaining reliability. It is also possible to avoid complication and high reliability of the arithmetic and control unit for navigation system, and thereby possible to expect a cost reduction in the entire system by separating the diagnostic information from the processes of collection and storage, and by limiting the processing of the computation control apparatus for navigation, which is required to perform various calculations, only to the collection and storage, which are its existing functions.

BRIEF DESCRIPTION OF THE DRAWINGS

FIG. 2 shows a table content of setting information 201;

DESCRIPTION OF THE EMBODIMENTS

An object of collecting and storing diagnostic information by vehicle-mounted equipment such as a vehicle navigation system while maintaining the reliability of a control based system has been achieved by following two embodiments.

Embodiment 1

Figure 1:
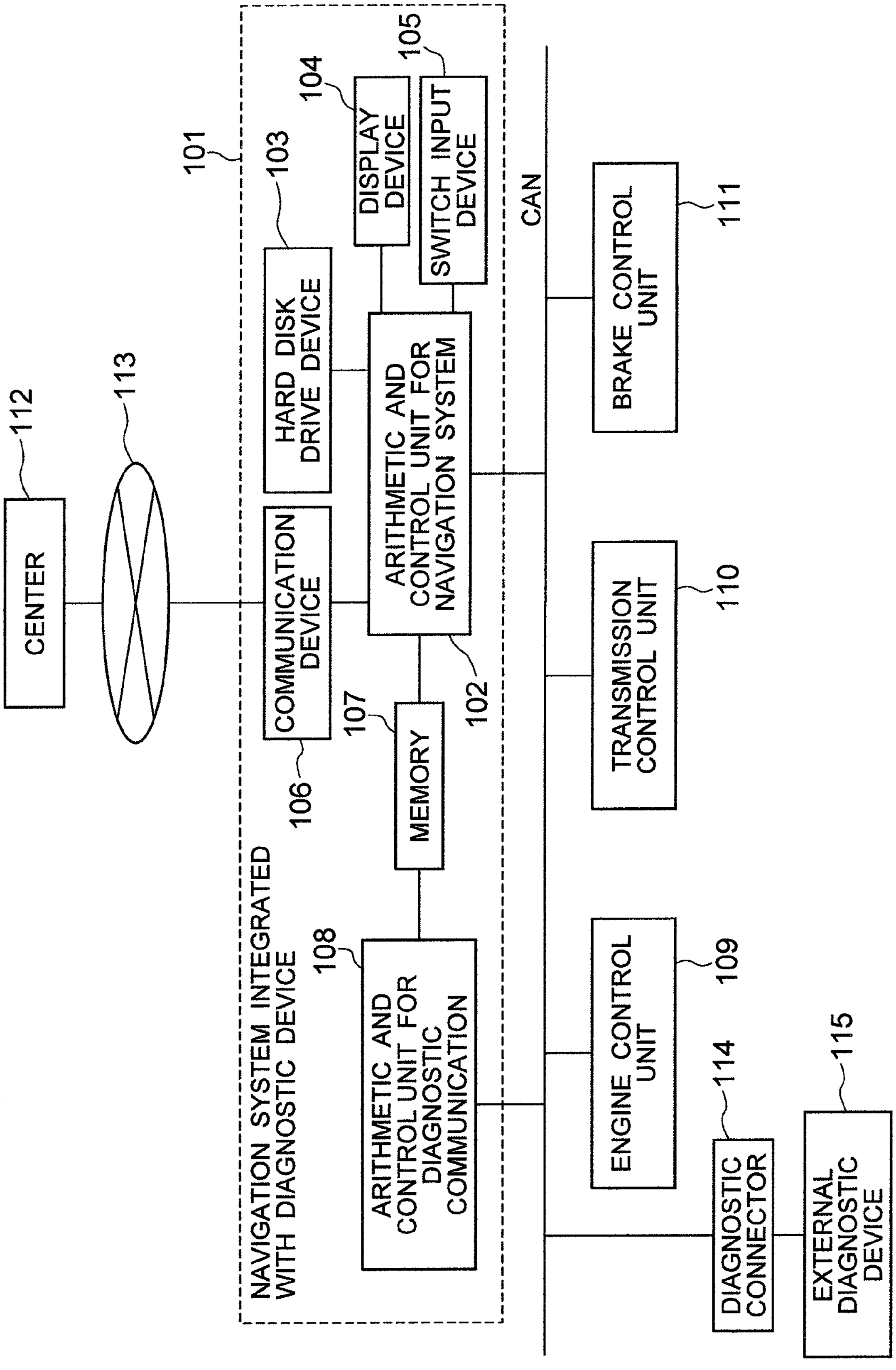
FIG. 1 shows a system configuration diagram of a vehicle-mounted navigation system integrated with a diagnostic device 101 according to an embodiment 1 of the present invention.

FIG. 1 is a system block diagram when a vehicle-mounted decoder/recorder according to the present invention is implemented by a navigation system integrated with diagnostic equipment 101.

The navigation system integrated with diagnostic equipment 101 comprises an arithmetic and control unit for navigation system 102 and an arithmetic and control unit for diagnostic communication 108. The arithmetic and control unit for navigation system 102 functions as an information collection means and an arithmetic and control means, and is structured to be provided with an interface for connecting to computers, a ROM, a RAM or various equipment. In the function as a vehicle navigation system, it is configured to search and map-display routes to a destination desired by a user. The arithmetic and control unit for navigation system 102 is also preinstalled with a data collection processing program and is configured to perform data collection processing as described later. A display device 104 and a switch input device 105, as an input means and an output means, are connected to the arithmetic and control unit for navigation system 102. A memory 107 as a storage device is also connected to the arithmetic and control unit for navigation system 102. The arithmetic and control unit for diagnostic communication 108 is also structured to be provided with various interfaces for connecting to a microcomputer, a ROM and a RAM or various devices. Setting information for collecting vehicle diagnostic information is stored in the memory 107, and it can be accessed from both the arithmetic and control unit for navigation system 102 and arithmetic and control unit for diagnostic communication 108.

The display device 104 is comprised of a liquid display panel or the like, and is configured to display map data necessary for map display or to display various guidance information. The switch input device 104 is configured to allow an operator or a worker to perform various input operations. The memory 107 is comprised of, for example, a flash memory, a RAM or the like.

The arithmetic and control unit for navigation system 102 is also connected to a hard disk drive device 103 as a medium driving means, where map data and programs for the navigation system are stored. While the hard disk drive device 103 is described in this embodiment, the medium may be a CD-ROM or a DVD instead.

Electronic control units (ECUs), which are vehicle-mounted units to be diagnosed, are connected to the arithmetic and control unit for navigation system 102 and arithmetic and control unit for diagnostic communication 108 via a control network such as a CAN. Diagnostic data indicating operational states of the units is obtained from the units to be diagnosed 109 to 111 in reply to an inquiry made by the arithmetic and control unit for diagnostic communication 108, and the obtained data is stored in the hard disk drive device 103. An example of the ECU includes an engine control unit 109, a transmission control unit 110, a brake control unit 111 or the like. The control network transmits control information between the electronic control units.

Here, it is preferable that the arithmetic and control unit for navigation system 102 just receives data from the CAN and does not transmit data to the CAN. In that case, since it does not operate on the CAN, the arithmetic and control unit for navigation system 102 is not required to have reliability comparable to that of the ECUs. In contrast, the arithmetic and control unit for diagnostic communication 108 transmits messages to the CAN even during vehicle running. Therefore, the arithmetic and control unit for diagnostic communication 108 is required to have hardware and software having reliability comparable to that of the ECUs. For example, it is required that the arithmetic and control unit for diagnostic communication 108 pass an environment resistance test or a duration test, which verifies the capability to withstand high heat or vibration.

When a dealer's mechanic diagnoses the control based system, such as the engine control unit 109, transmission control unit 110 or brake control unit 111, the mechanic can access each control unit and navigation system integrated with the diagnostic device 101 by connecting an external diagnostic device 115 to a diagnostic connector 114 on the vehicle side, which is also connected to the CAN. It should be noted that the inquiry/response protocol of the diagnostic communication is standardized according to ISO15765 or the like, and can be implemented by complying with the communication protocol.

Furthermore, in the present embodiment, the arithmetic and control unit for navigation system 102 is equipped with a communication device 106. The communication device 106 communicates with an external center 112 based on a communication request from the arithmetic and control unit for navigation system 102 via a mobile communication network 113.

The navigation system integrated with diagnostic device 101, CAN, electronic control units and diagnostic connector 114 are mounted on a vehicle.

FIG. 2 shows the content of setting information 201 which is shared by the arithmetic operation of the arithmetic and control unit for navigation system 102 and the arithmetic operation of the arithmetic and control unit for diagnostic communication 108. A setting ID 202 is assigned to the setting information 201 as a managerial attribute. The setting ID 202 is sequentially assigned by a manager for each update. It is possible to make sure whether the current setting information is latest or not by checking the setting ID 202. In the present embodiment, the content of the setting information 201 comprises a sequence number, a transmission CAN ID, a reception CAN ID, a service ID, a parameter, a period, an importance level, a list of trigger conditions, and a pre-trigger time. The sequence number is the serial number of a list. The transmission CAN ID is a CAN ID attached to the header of a CAN message which is transmitted by the arithmetic and control unit for diagnostic communication 108 to the ECU. This is used by the ECU side to determine whether to receive the message and to select a packet (data) to respond. In contrast, the receipt CAN ID represents a CAN ID attached to the header of a response CAN message from the ECU. Typically, a fixed value is previously assigned to the transmission ID to the ECU and the reception CAN ID from the ECU for each ECU. However, it is also possible to change the transmission CAN ID and reception CAN ID by giving a rewrite message to them. In the ISO15765, services are defined according to the way how the diagnostic information, which is desired to be obtained, is obtained, and an ID is assigned to each service. This is referred to as a service ID. For example, a service ID "19" refers to "ReadDTCInformation," and means a service for reading the information of a diagnostic trouble code (Diagnostic Trouble Code: DTC). Other services include "ReadDataByIdentifier" (service ID=22), "ReadMemoryByAddress" (service ID=23) and the like. The service ID=22 and service ID=23 mean reading of data associated with the ID defined for each vehicle or ECU, and reading of values on a relevant memory based on the address information defined for the ECU, respectively. The parameter represents an argument required by a sub function possessed by the service or required by the service. For example, a parameter "02" for a service ID "19" refers to "reportDTCByStatusMask," meaning the use of reading processing of DTC by a status mask (StatusMasK). When reading a DTC for the whole status, the status mask is inquired as "FF." Therefore, the whole parameter in this case is "02FF." A period must be set during which the arithmetic and control unit for diagnostic communication 108 makes such an inquiry, and this period is read from the period field in the list. Time may be used in place of the period. The importance level in the setting information 201 indicates the level of importance of data to be collected. In the present invention, "A" is set to the item with a high importance level, while "B" is set to the item with a standard level. The trigger condition and pre-trigger information in the setting information 201 are information to be set when the information prior to and subsequent to the occurrence of an event as a trigger is desired to be collected. Details thereof will be described later in an embodiment 2. When the setting information 201 is updated, the time and data when the update is made are recorded in an update time and date field 203. The setting information 201 is stored in the memory 107.

Figure 3:
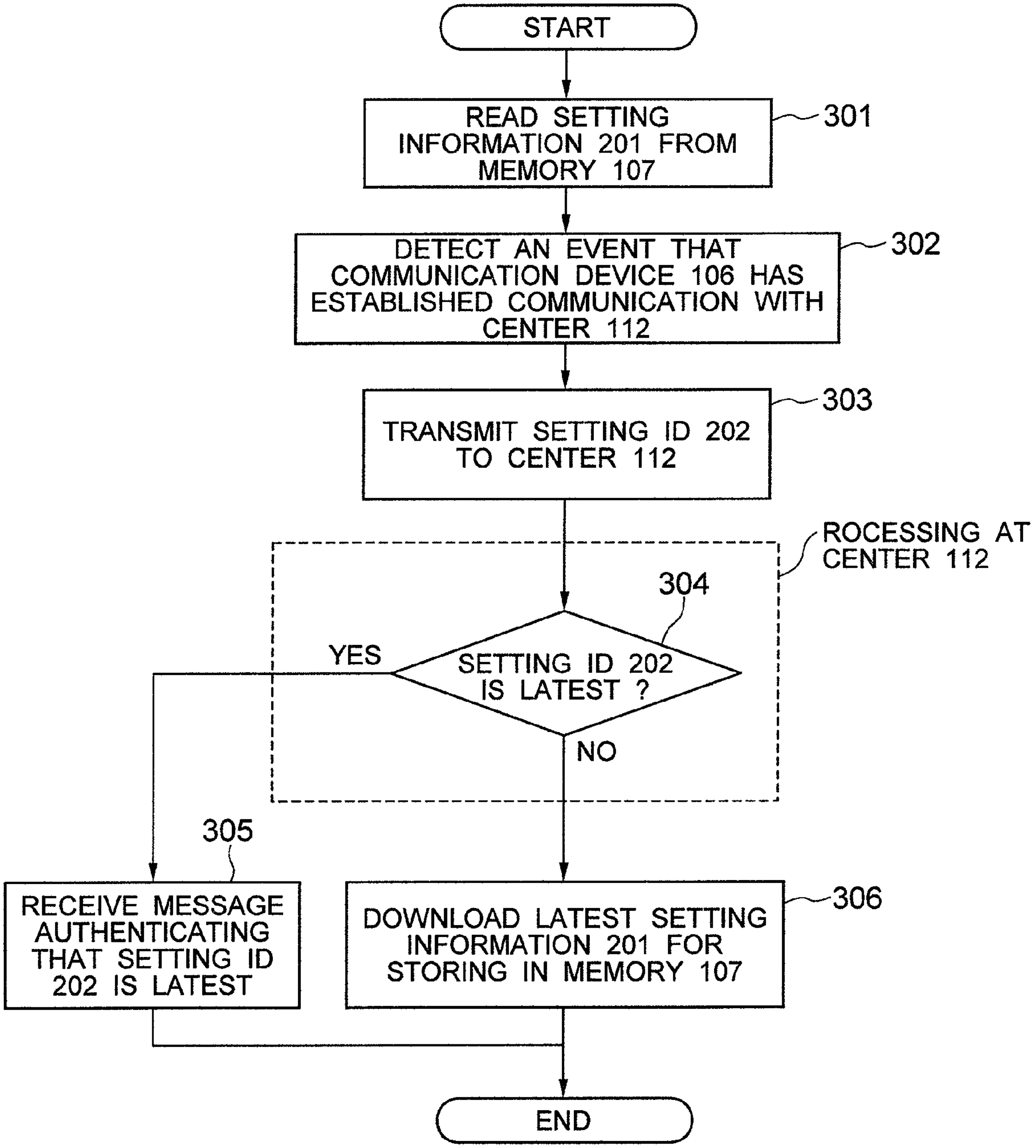
FIG. 3 shows a processing flow when obtaining the latest setting information 201 from a center 112.

FIG. 3 shows a flowchart when asking the center 112 to check whether the setting information 201 is latest or not. First, the arithmetic and control unit for navigation system 102 reads the setting information 201 from the memory 107 (step 301). Then, if the communication device 106 detects an event (step 302) that the communication with the center 112 has been established, after the communication with the center 112 is established through the input operation of the switch input device 105 in order to obtain contents such as traffic information, or after the communication with the center 112 is automatically established during the start-up of the arithmetic and control unit for navigation system 102 (within a predetermined time from power on), then the setting ID 202 of the setting information 201 is transmitted to the center 112 (step 303) to ask the center 112 to check whether the setting information is latest. The center 112 checks whether the setting ID202 is latest (step 304). When it is latest, the center 112 transmits a message authenticating that it is latest, and when it is not latest, the center 112 transmits the latest setting information 201 in response to the request. The arithmetic and control unit for navigation system 102, when it is latest, receives the message authenticating that it is latest (step 305). The arithmetic and control unit for navigation system 102, when it is not latest, downloads the latest setting information 201 for storing in the memory 107 (step 306). In this way, the arithmetic and control unit for navigation system 102, which is capable of being externally connected in a positive manner via the communication device 106, manages the setting information 201.

Figure 4A:
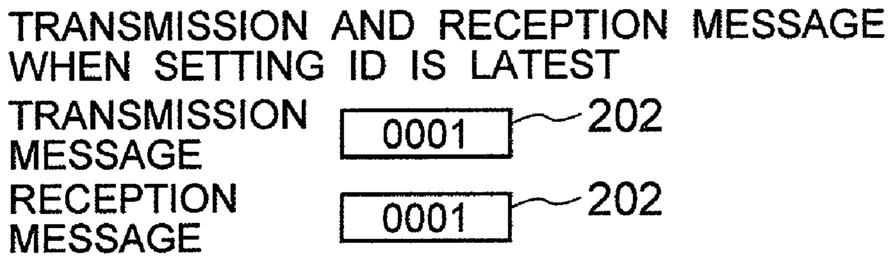
FIGS. 4A and 4B show an exemplary transmission and reception messages when obtaining the latest setting information 201 from the center 112.
Figure 4B:
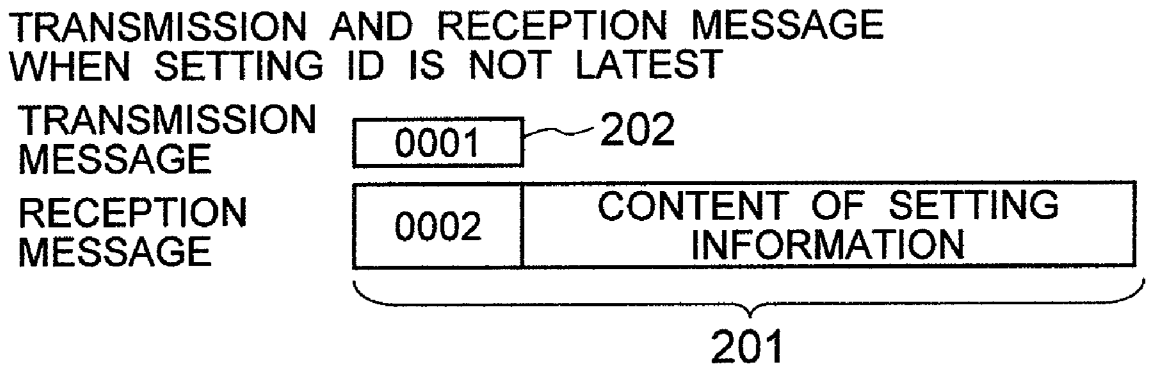

FIGS. 4A and 4B show an example of transmission and reception messages for checking whether the setting information is latest or not. In the present embodiment, the message to be transmitted to the center 112 is limited to the setting ID 202. As FIG. 4A shows, when the setting information 201 is latest, only the information of the setting ID 202 having the same value is transmitted as a reception message. As FIG. 4B shows, when the setting information 201 is not latest, the information of the setting information 201 including the latest setting ID 202 is transmitted as a reception message.

Figure 5:
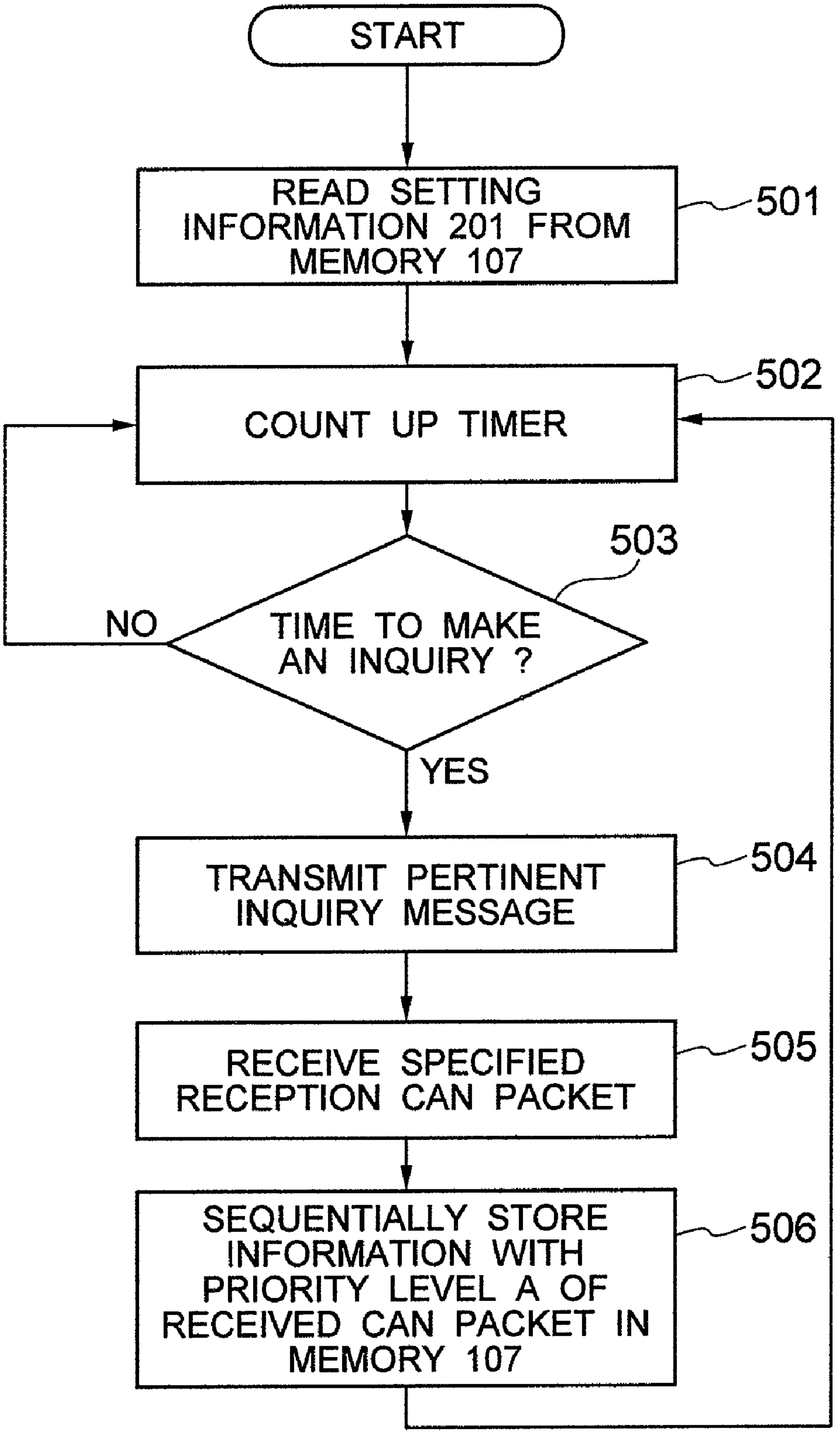
FIG. 5 shows a processing flow of diagnostic communication and data storage by an arithmetic and control unit for diagnostic communication 108.

FIG. 5 shows a processing flow when the arithmetic and control unit for diagnostic communication 108 performs diagnostic communication with each ECU. It is preferable that the processing is performed periodically such that the latest setting information 201 is used. First, the setting information 201 is read from the memory 107 (step 501). The arithmetic and control unit for diagnostic communication 108 counts up an internal timer (step 502) to determine whether it is time to make an inquiry or not based on the period described in the setting information 201 (step 503). When it is not time to make an inquiry, the processing flows returns to the timer count up step (step 502). When it is time to make an inquiry, a relevant inquiry message is transmitted in accordance with the setting information 201 (step 504). Then, CAN packets which are specified by a "reception CAN ID" described in the setting information 201 are received (step 505). The received CAN packets may be a reply message responding to the inquiry to the ECU, or may be ones which are transmitted and received between the ECUs for control purposes. When the received CAN packets are the ones that are transmitted and received between the ECUs for control purposes, a value indicating a blank may be entered in the "transmission CAN ID" field of the setting information 201. Of the received CAN packets, information with importance level A is sequentially stored in the memory 107 (step 506). When storing the received CAN packets in the memory 107, the arithmetic and control unit for diagnostic communication 108 may store only the received CAN packets, or may store them together with at least one of the setting ID 202, sequence number, transmission CAN ID, service ID, period, importance level and trigger condition of the setting information 201. Information with importance level B or lower may be discarded. In this manner, the arithmetic and control unit for diagnostic communication 108 stores the latest ones of the CAN packets received for diagnostic purposes in the memory 107. However, the storage of the CAN packets in the memory 107 by the arithmetic and control unit for diagnostic communication 108 is not absolutely required. It should be noted that the arithmetic and control unit for diagnostic communication 108 performs diagnostic communication with each ECU, but does not access the center 112 in a positive manner via the arithmetic and control unit for navigation system 102, hard disk 103, or communication device 106.

Figure 6A:
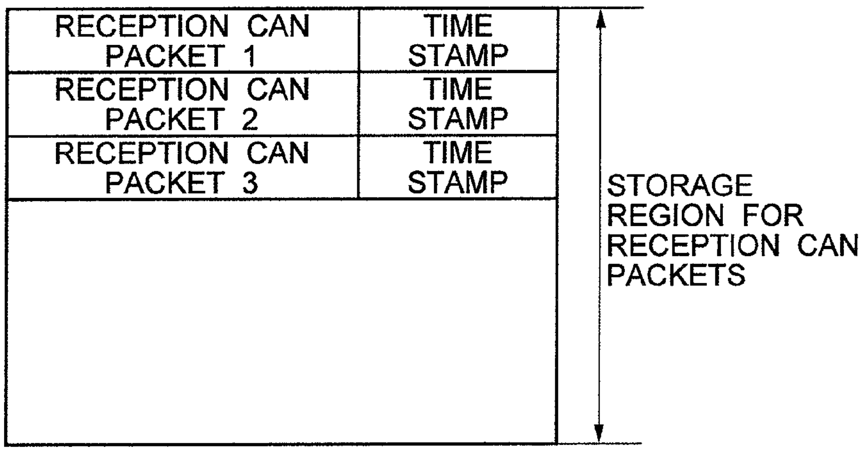
FIGS. 6A to 6C show a method of storing reception CAN packets in reception CAN packet storage regions.
Figure 6B:
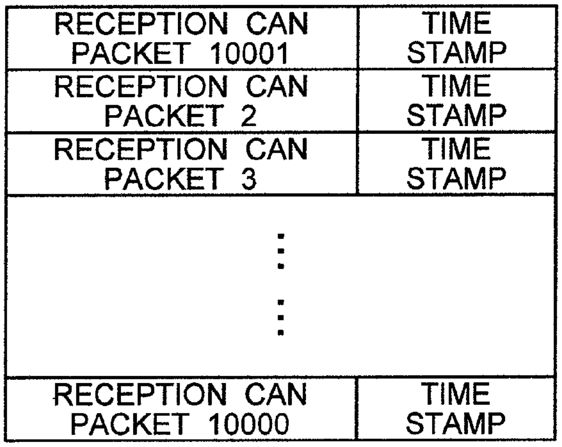

A method of sequentially storing the CAN packets in the memory 107 will be described with reference to FIGS. 6A and 6B. In the memory 107, a region where the received CAN packets attached with time stamps are stored is provided in a fixed manner separately from the region where the setting information 201 is stored. In the present embodiment, a region is provided where 10,000 packets are stored. As FIG. 6A shows, once collection starts, the received packets are sequentially stored in the region from the top to the bottom in the region. When the number of received packets exceeds 10,000, the storage returns to the top of the region where the next received CAN packet is stored, as shown in FIG. 6B. This is repeated endlessly and the latest 10,000 packets are continued to be stored.

Figure 7:
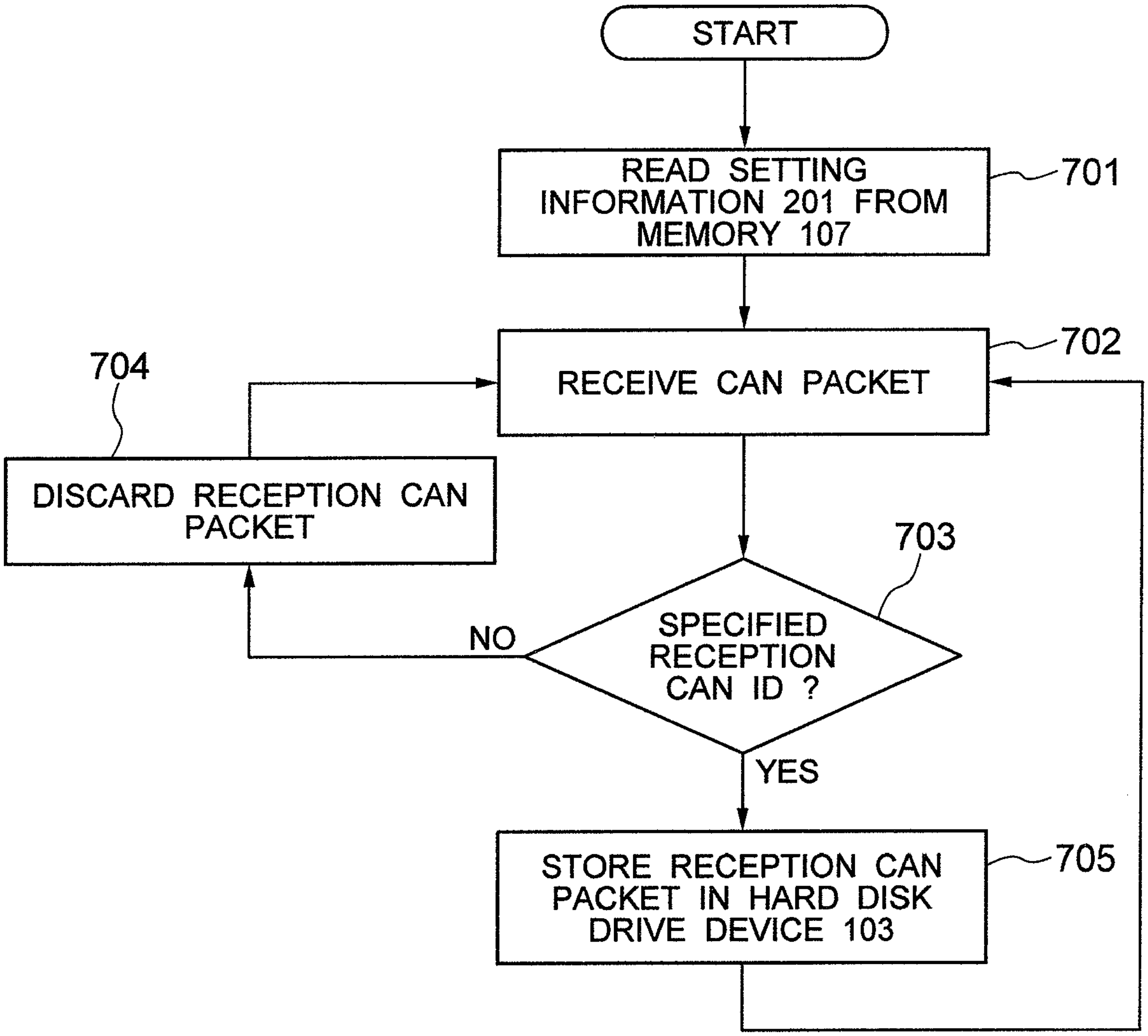
FIG. 7 shows a processing flow of data collection and data storage by an arithmetic and control unit for navigation system 102.

A processing flow is shown in FIG. 7 in which the arithmetic and control unit for navigation system 102 receives a message from the ECUs that responds to the inquiry made by the arithmetic and control unit for diagnostic communication 108 and collects and stores desired vehicle diagnostic information. It is preferable that the processing is periodically performed such that the latest setting information 201 is used. First, the arithmetic and control unit for navigation system 102 reads setting information 201 from the memory 107 (step 701). Then, the arithmetic and control unit for navigation system 102 receives CAN packets (step 702), and determines whether the CAN ID of the received CAN packets is specified based on the "reception CAN ID" of the setting information 201 or not (step 703). When the CAN ID of the received CAN packet is not specified, the received CAN packet is discarded (step 704). When the CAN ID of the received CAN packet is specified, the received CAN packet is stored in the hard disk drive device 103. In this manner, the arithmetic and control unit for navigation system 102 stores CAN packets in the hard disk drive device 103 without limiting to latest CAN packets. When storing the received CAN packets in the memory 107, the arithmetic and control unit for navigation system 102 may store only the received CAN packets, or may store them together with at least one of the setting ID 202, sequence number, transmission CAN ID, service ID, parameter, period, importance level and trigger condition of the setting information 201.

In this manner, the arithmetic and control unit for navigation system 102 selects and receives CAN packets for diagnosis using the setting information 201 shared by the arithmetic and control unit for diagnostic communication 108, or the setting information 201 used by the arithmetic and control unit for diagnostic communication 108 when making an inquiry to the ECUs. Thus, CAN packets that are not limited to the latest CAN packets, which are requested by the arithmetic and control unit for diagnostic communication 108 for diagnosis, are stored in the hard disk drive device 103 by the arithmetic and control unit for navigation system 102.

Since the arithmetic and control unit for navigation system 102 and the arithmetic and control unit for diagnostic communication 108 share the setting information 201 via the memory 107, they do not have to transmit and receive the setting information 201 therebetween over the CAN, thus having no effect on the control information that flows in the CAN.

Embodiment 2

Now, another embodiment of the present invention will be described in which the arithmetic and control unit for navigation system 102 and the arithmetic and control unit for diagnostic communication 108 are mounted on separate terminal units.

Figure 8:
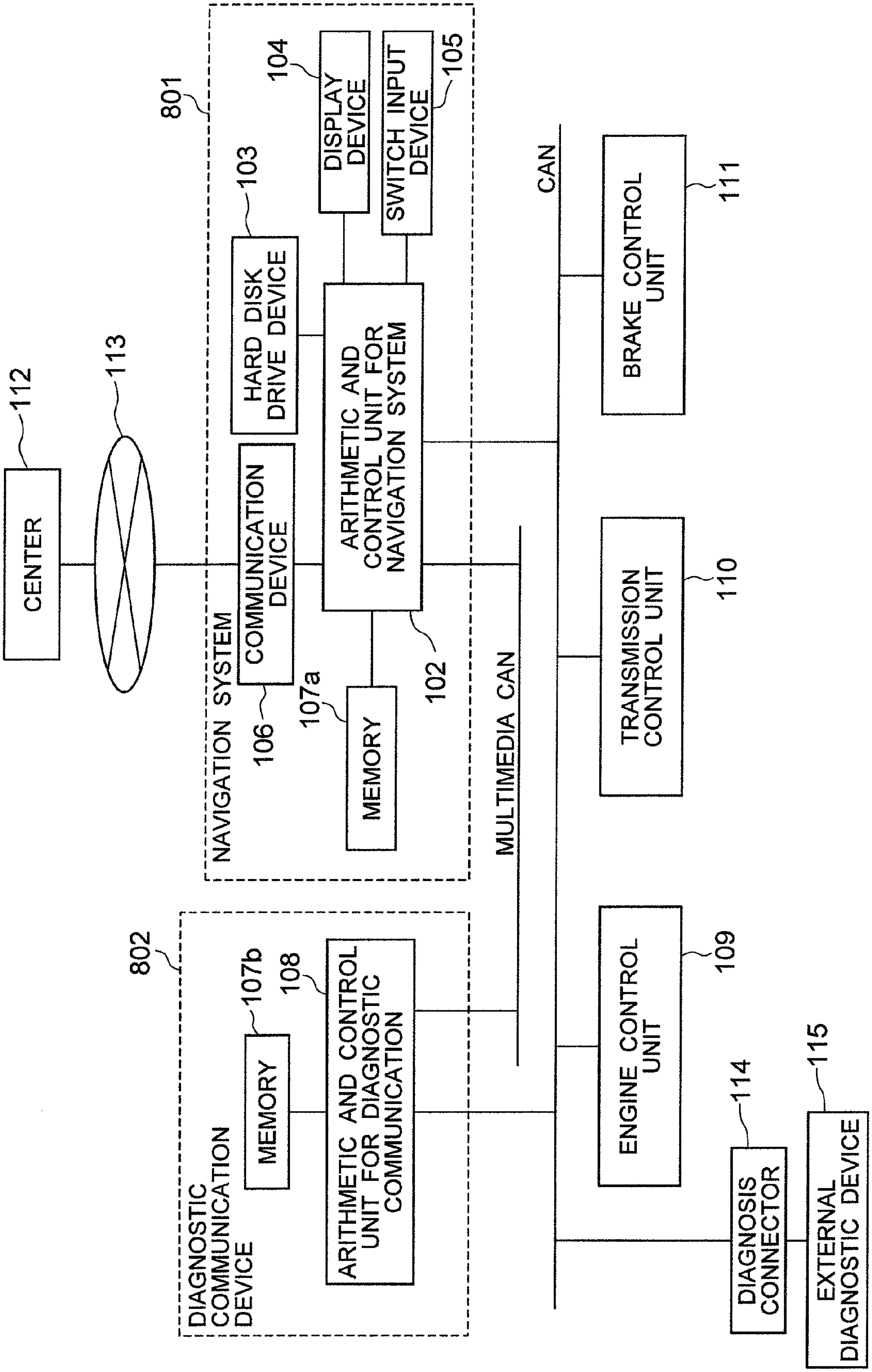
FIG. 8 shows an entire block diagram including a navigation system 801 and a diagnostic communication device 802 according to an embodiment 2 of the present invention.

The entire system structure is shown in FIG. 8. A navigation system 801 comprises an arithmetic and control unit for navigation system 102, a display device 104, a switch input device 105, a communication device 106, and a hard disk drive device 103 and a memory 107*a* as a storage device. A diagnostic communication device 802 comprises an arithmetic and control unit for diagnostic communication 108 and a memory 107*b* as a storage device. The navigation system 801 and diagnostic communication device 802 are connected via a CAN for multimedia communication having no effect on vehicle control connected as well as via a CAN for control. Here, another connection interface other than the CAN for multimedia communication may be used to connect the navigation system 801 and diagnostic communication device 802.

In the present embodiment, information collection is performed based on a trigger. As for data items which are desired to be determined as the trigger out of the information to be collected, trigger conditions are set in pertinent locations of the setting information 201. Moreover, in order to store the information prior to and subsequent to the occurrence of the trigger, an entry is made in a field of "pre-trigger time" in the setting information 201 to specify how many seconds before the occurrence of the trigger to start capturing the data.

Figure 9:
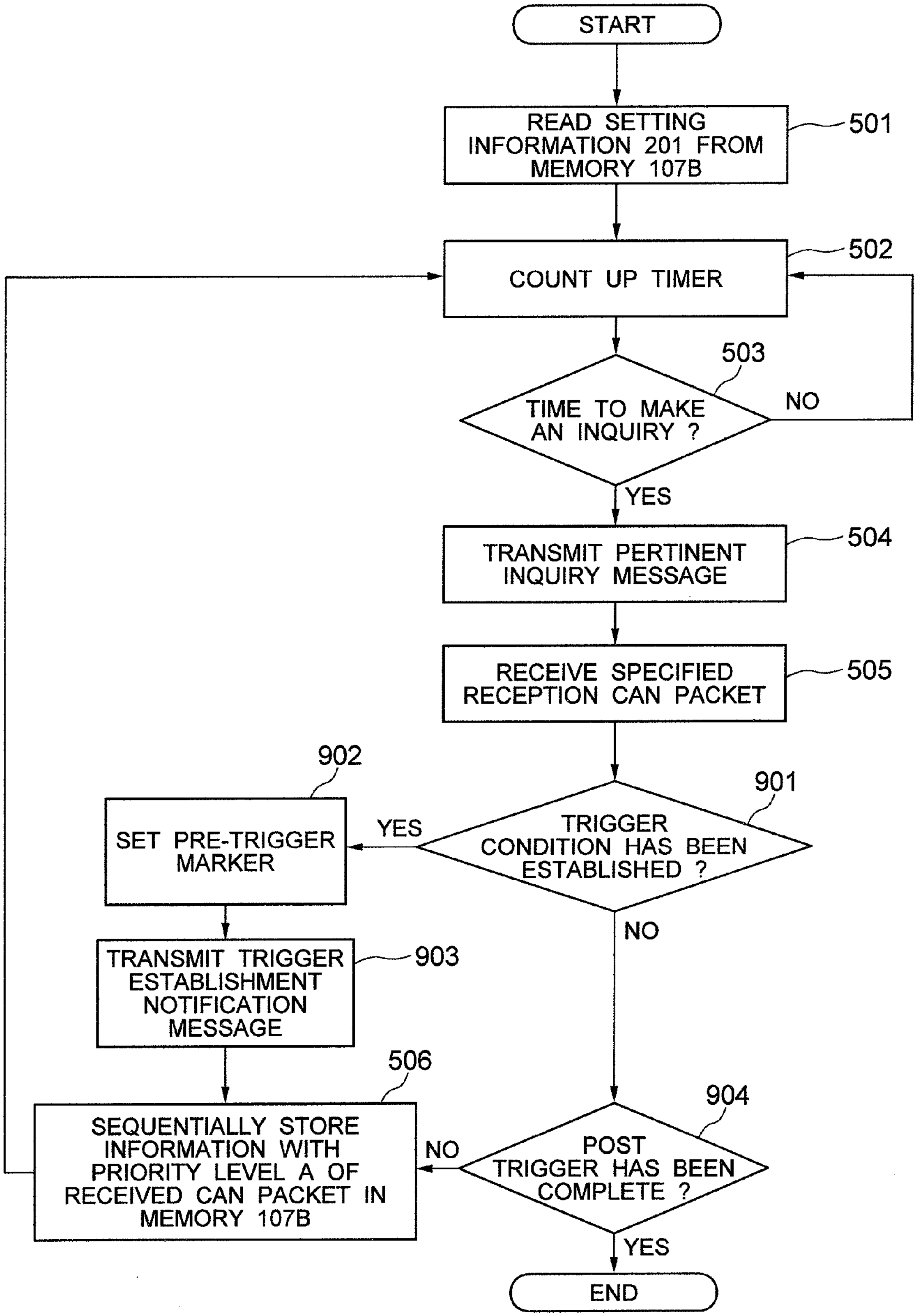
FIG. 9 shows a processing flow for storing data by a trigger evaluation in the diagnostic communication device 802.

A processing flow is shown in FIG. 9 in which the arithmetic and control unit for diagnostic communication 108 makes an inquiry. Steps from 501 to 505 are the same as those shown in FIG. 5 of the embodiment 1. After the step 505 in which specified CAN packets are received, determination is made on whether a trigger is established (step 901). When the trigger is established, a pre-trigger marker is set (step 902).

Figure 6C:
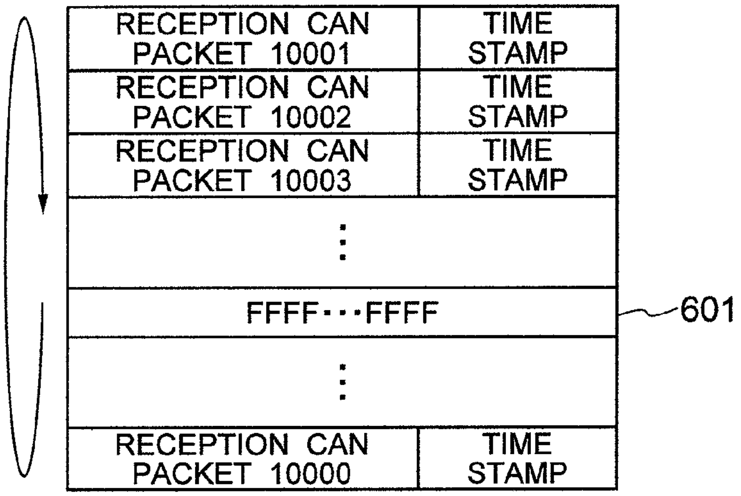

Here, the pre-trigger marker will be described with reference to FIG. 6C. When the occurrence of a trigger is detected, the operation returns by the pre-trigger time described in the setting information 201 and a record immediately before the pre-trigger time is filled with "FFFF . . . FFFF." This is referred to as a pre-trigger marker 601. It is possible to determine whether a post trigger has been complete by checking whether a region to be recorded next is the pre-trigger marker 601 or not.

After the trigger marker is set, the diagnostic communication device 802 transmits a trigger establishment notification message to the navigation system 801 (step 903). As the trigger establishment notification message, just an empty message with a previously defined CAN ID may be transmitted. Alternatively, a message may be transmitted that is attached with a previously defined message such as an "FFFF". Then, in step 506, information with an importance level A of the received CAN packets is stored in the memory 107*b*. When the trigger condition is not established in step 901, determination is made on whether a post trigger is complete or not by checking whether the next written record is a pre-trigger marker or not (step 904). When the post trigger is not complete, the processing flow advances to step 506. When the post trigger is complete, the collection terminates.

Figure 10:
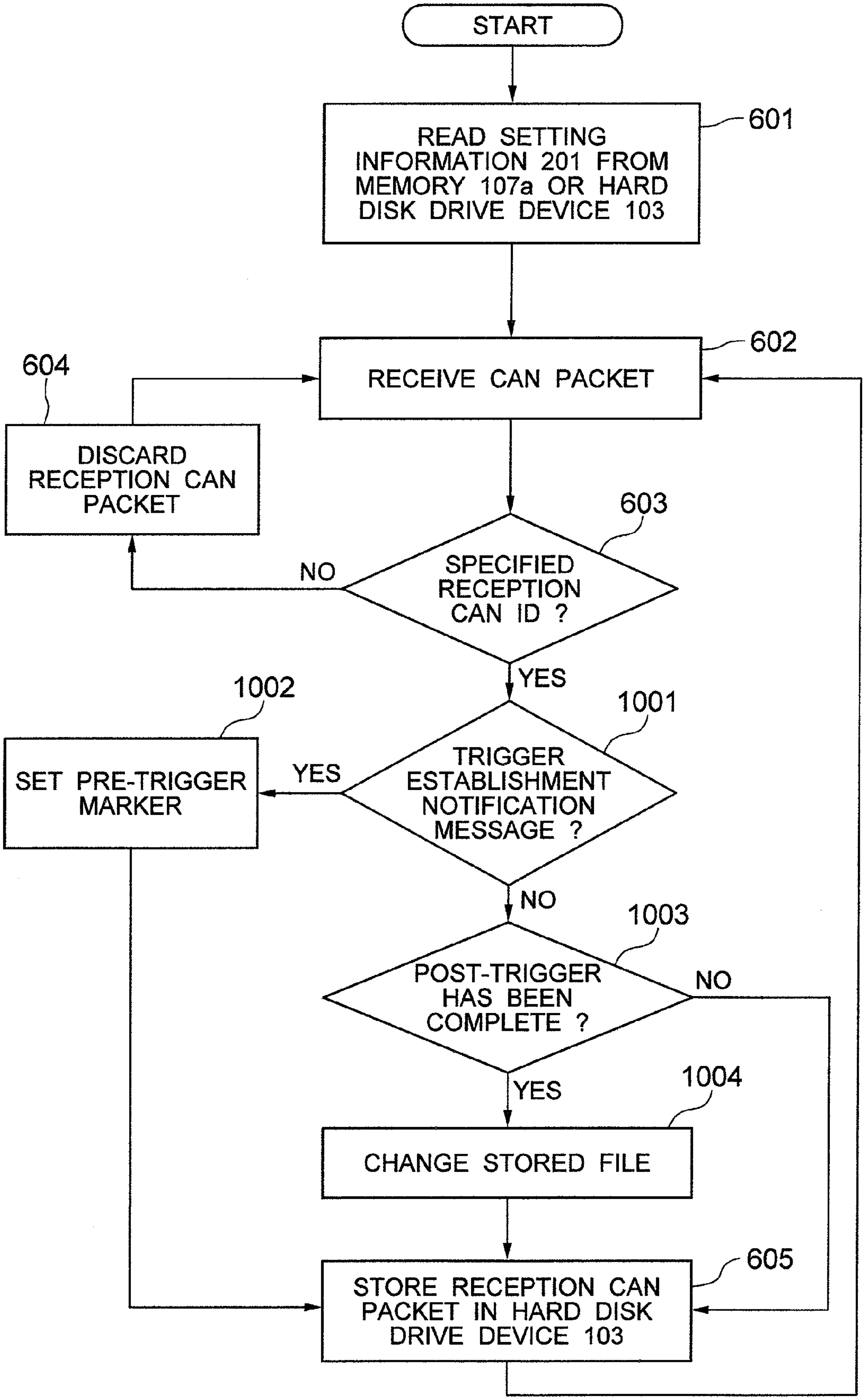
FIG. 10 shows a processing flow for storing data by a trigger evaluation in the navigation system 801.

A vehicle information collection processing flow by the navigation system 801 will be shown in FIG. 10. First, in step 601, the arithmetic and control unit for navigation system 102 reads the setting information 201 from a memory 107*a* or from a hard disk drive 103. Then, in steps 602 to 604, CAN packets to be collected are filtered. Determination is made on whether the obtained CAN packets are a trigger establishment notification message from the diagnostic communication device 802 (step 1001). When it is the trigger establishment notification message, then the pre-trigger marker 601 is set in a collection data storage region in the navigation system 801 (step 1002), and the received CAN packets are stored in the hard disk drive device 103 in step 605. When the received CAN packet is not the trigger establishment notification message, determination is made on whether the post trigger is complete (step 1003). When it is complete, then a file in the storage region is changed (step 1004), and the processing flow advances to step 605. When the post trigger is not complete, then the processing flow directly advances to step 605 to proceed with collection and storage operations.

Figure 11:
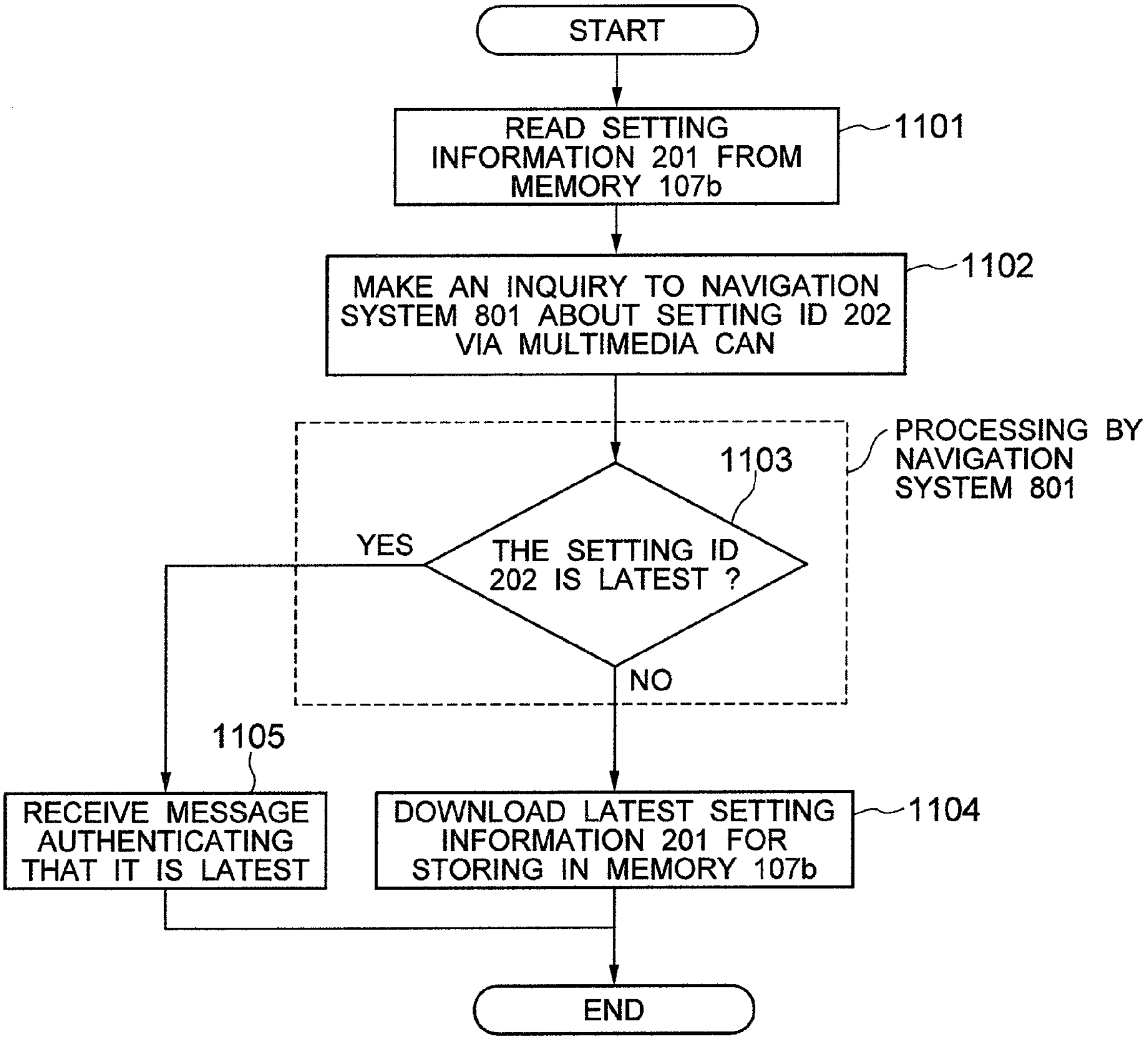
FIG. 11 shows a processing flow for updating setting information 201 in the diagnostic communication device 802 in coordination with the navigation system 801.

A fixed value common to the navigation system 801 and diagnostic communication device 802 may be previously stored in the setting information 201. However, a case in which the setting information 201 is updated will be described hereinafter. A processing flow in which the navigation system 801 updates the setting information 201 in the memory 107*a* is the same as that in FIG. 3 of the embodiment 1. The processing flow is shown in FIG. 11 in which the diagnostic communication device 802 updates the setting information 201. First, the arithmetic and control unit for diagnostic communication 108 reads the setting information 201 from the memory 107*b* (step 1101) and makes an inquiry to the navigation system 801 via the multimedia CAN (step 1102). The navigation system 801 determines whether the setting ID 202 is latest or not (step 1103). When it is latest, the navigation system 801 transmits a message authenticating that it is latest in reply to the inquiry, and when it is not latest, the navigation system 801 transmits the latest setting information 201 in reply. The arithmetic and control unit for diagnostic communication 108, when the setting ID 202 is not latest, downloads the latest setting information 201 and stores it in the memory 107*b* (step 1104). The arithmetic and control unit for diagnostic communication 108, when it is latest, makes sure that it is the latest message by receiving the message authenticating that it is latest (step 1105).

Figure 12:
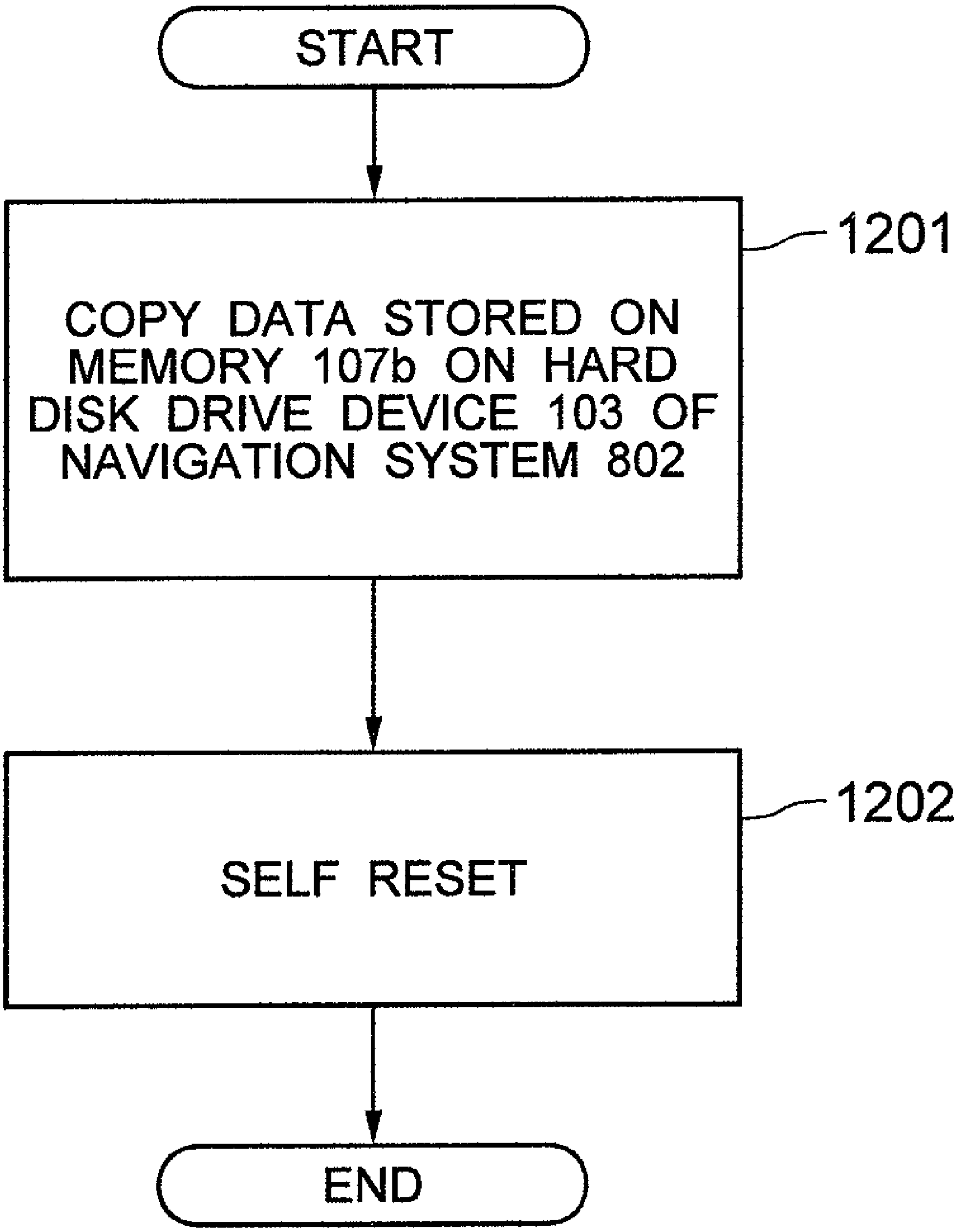
FIG. 12 shows a processing flow when backing up the data that is collected and stored in the diagnostic communication device 802 in the navigation system 801.

In the present embodiment, the diagnostic communication device 802 stores one trigger determination worth of only data with importance level. However, data with importance level of is sometimes desired to be obtained by a plurality of times. Therefore, a processing flow will next be described with reference to FIG. 12 in which the data stored in the diagnostic communication device 802 is backed up in the navigation system 801 and collection is restarted. First, the arithmetic and control unit for diagnostic communication 108 of the diagnostic communication device 802 makes a copy of the data stored on the memory 107*b* on the hard disk drive device 103 of the navigation system 801 (step 1201). After the copy making is completed, the diagnostic communication device 802 resets itself (step 1202) to resume diagnostic communication and data collection.

Figure 13:
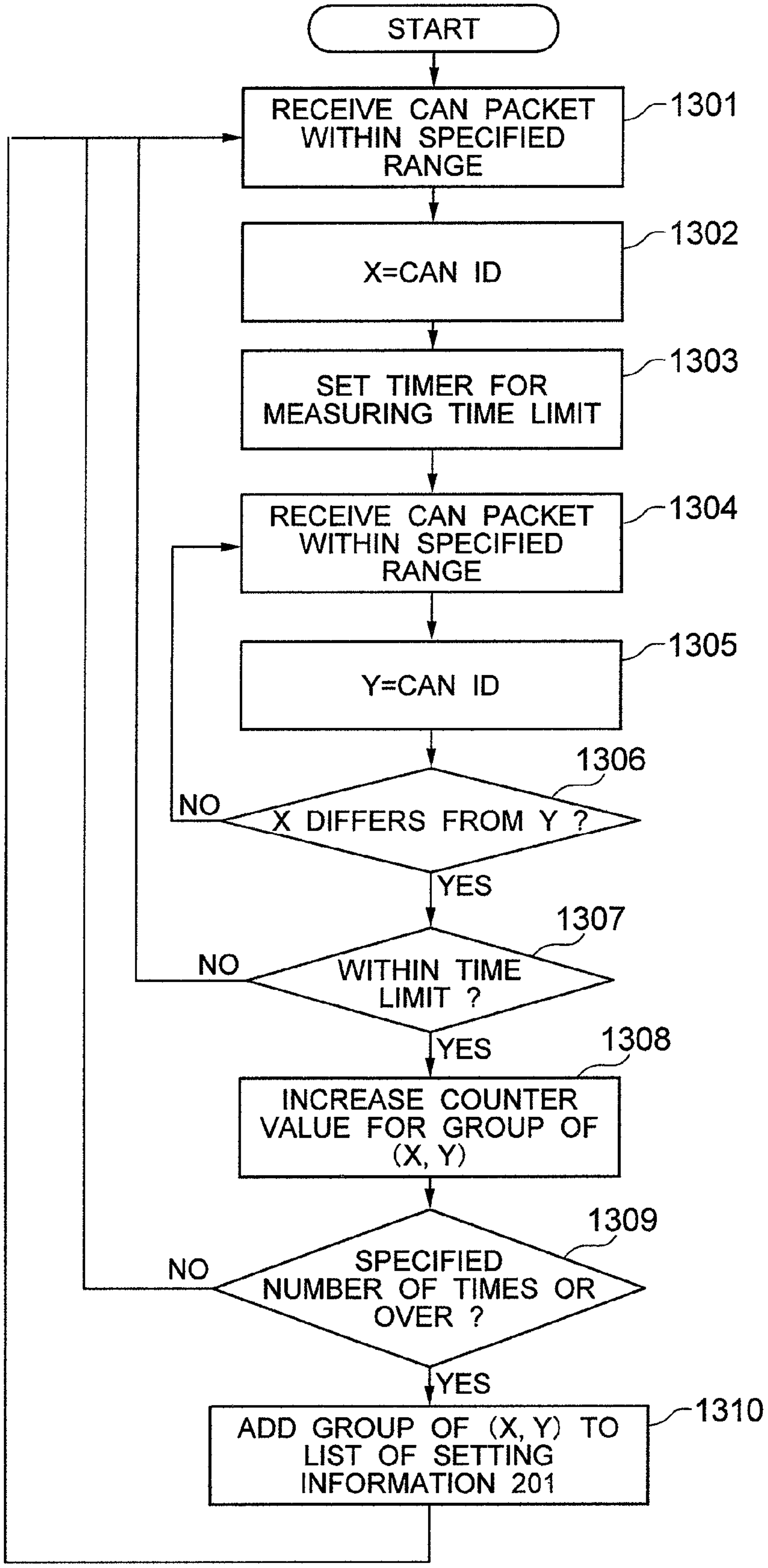
FIG. 13 shows a processing flow for adding collection items to setting information 201 in the navigation system 801 by the monitoring of the diagnostic communication.

In the foregoing description, it is assumed that the navigation system 801 previously has the setting information 201 before the operation of the entire system starts. However, there is a case in which the setting information 201 is not set in advance or a case in which the setting information 201 is lost due to a data corruption or the like. Therefore, a description is provided here on how to deal with such a case with reference to FIG. 13. First, CAN packets having CAN ID within a specified range are received (step 1301). Here, the allowable range of the CAN ID to be specified is the range of the CAN ID assigned to the diagnostic communication. It can be specified as, for example, 500 to 50F in hexadecimal digit. When the CAN packet is received, the CAN ID is stored as X (step 1302) and a timer is set for measuring a time limit (e.g., 10 milliseconds) (step 1303). After the timer is set, CAN packets having the CAN ID within the specified range are received again (step 1304) and the received CAN ID is stored as Y (step 1305). Determination is made on whether X differs from Y (step 1306), and when they are the same, the flow returns to step 1304. When they differ from each other, check is made on whether the reception is within the time limit (step 1307), and when it is within the time limit, a counter is set to a group of (X, Y) and the counter value is increased by one (step 1308). When the time limit is exceeded, the flow returns to step 1301. The steps 1301 to 1308 are repeated and determination is made on whether the counter value is a specified number (e.g., 10) or more (step 1309). When it is the specified number or more, the record of the setting information 201 is added, and X is set to the field of the transmission CAN ID, while Y is set to the field of the reception CAN ID (step 1310).

When it can be confirmed from the foregoing processing and through monitoring that the same diagnostic communication is periodically made from the diagnostic communication device 802, it can be determined that the data should be collected by the navigation system 801 and the setting information 201 can be then updated.

Figure 14:
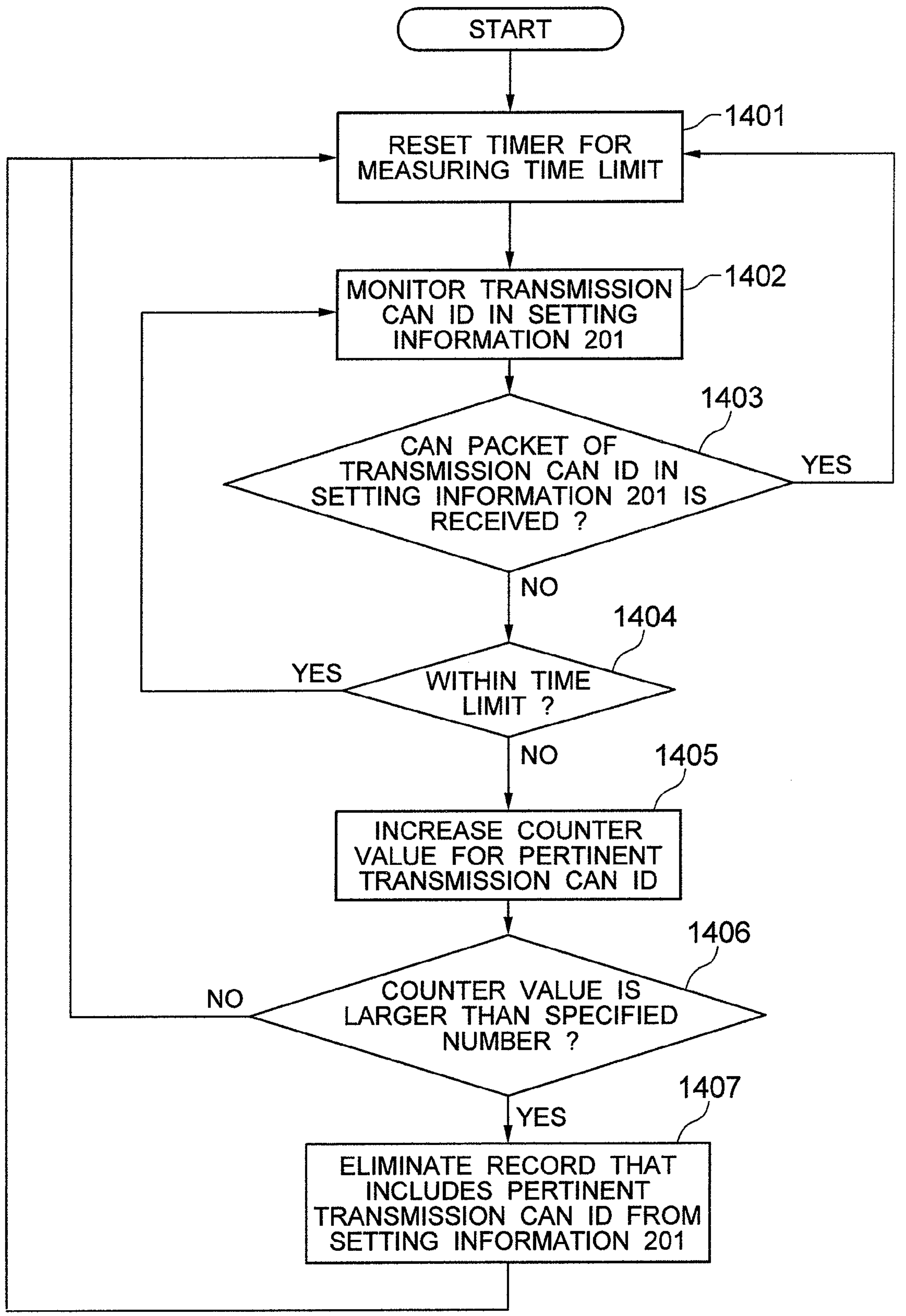
FIG. 14 shows a processing flow for eliminating collection items from the setting information 201 in the navigation system 801 by the monitoring of the diagnostic communication.

FIG. 14 shows a processing flow in which when the setting information 201 of the diagnostic device 802 is updated and items to be collected are eliminated, the navigation system 801 follows suit. First, a timer is set for measuring a time limit (e.g., 300 milliseconds) and time measurement is started (step 1401). Then, CAN packets including a transmission CAN ID in the list of the setting information 201 are monitored (step 1402). Determination is made on whether the CAN packets having the predetermined CAN ID are received (step 1403), and when they are received, the flow returns to step 1401. When they are not received, determination is made on whether the time limit is reached (step 1404), and when the time limit is not reached yet, the flow return to step 1402. When the time limit is exceeded, the counter value of the pertinent transmission CAN ID is increased by one (step 1405). Determination is made on whether the counter value is the predetermined number (e.g., 10) or more (step 1406), and when the counter value reaches the specified value or more, a record including the pertinent transmission CAN ID is eliminated from the list of the setting information 201 (step 1407).

When it can be confirmed from the foregoing processing that periodic diagnostic communication from the diagnostic communication device 802 has stopped, then it is determined that the setting information 201 of the diagnostic communication device 802 has been updated, and the record is eliminated from the list of the setting information 201 of the navigation system 801.

The present invention is available for use in a decoder/recorder that is mounted on a vehicle to collects and stores vehicle diagnostic information.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A vehicle-mounted system connected to a control system network in a vehicle, comprising:

a diagnostic communication circuit for collecting diagnostic information from electronic control units in the vehicle via said control system network;

a collection circuit, provided as a separately operational circuit from said diagnostic communication circuit, for collecting information flowing in said control system network;

a storage circuit for storing the information collected by said collection circuit; and a shared storage circuit accessed from both said diagnostic communication circuit and said collection circuit, for storing setting information which is shared by said diagnostic communication circuit and said collection circuit in order to perform said diagnostic information and said information collection.

2. The vehicle-mounted system connected to the control system network in a vehicle according to claim 1, wherein said setting information comprises at least one of an identifier of the setting information, a transmission ID, a reception ID, an ID for identifying the means for obtaining diagnostic information, a period during which diagnostic communication is performed, an importance level of the information to be collected, and a trigger evaluation condition as an attribute.

3. The vehicle-mounted system connected to the control system network in a vehicle according to claim 1, wherein said setting information comprising:

a circuit for communicating with an external center;

a circuit for reading said setting information from said shared storage circuit;

a circuit for detecting an event that communication with said center has been established;

a circuit for making an inquiry to said center about the identifier of said setting information;

a circuit for receiving a message authenticating that it is latest from said center when the identifier of said setting information is latest; and a circuit for receiving the latest said setting information from said center for updating when the identifier of said setting information is not latest.

4. The vehicle-mounted system connected to the control system network in a vehicle according to claim 1, wherein said diagnostic communication circuit makes a request to said electronic control units for said diagnostic information based on said setting information in said shared storage circuit via said control system network, and wherein said collection circuit selects said diagnostic information, which is requested to said electronic control units from said diagnostic communication circuit based on said setting information in said shared storage circuit, out of the information received via said control system network.

5. The vehicle-mounted system connected to the control system network in a vehicle according to claim 1, wherein said diagnostic communication circuit has at least one of an excellent heat resistant property, a high vibration resistance, an excellent earthquake resistant property and a long life compared with said collection circuit.

6. The vehicle-mounted system connected to a control system network in a vehicle according to claim 1, wherein the collection circuit is arranged to receive information from the control system network without any transmission of information toward the control system network.

7. The vehicle-mounted system connected to the control system network in a vehicle according to claim 3, wherein the circuit for communicating with the external center performing such communicating without passing through the control system network.

8. A vehicle-mounted system connected to a control system network in a vehicle, comprising:

a diagnostic communication circuit for performing diagnostic communication for collecting diagnostic information from the electronic control units in the vehicle via said control system network;

a storage medium managed by said diagnostic communication circuit;

a collection circuit, provided as a separately operational circuit from said diagnostic communication circuit, for collecting the information flowing in said control system network;

a shared storage circuit accessed from both said diagnostic communication circuit and said collection circuit, for storing the information collected by said collection circuit, and for storing setting information which is shared by said diagnostic communication circuit and said collection circuit in order to perform said diagnostic information and said information collection a circuit for making an inquiry to said diagnostic communication circuit about the identifier of said setting information stored in said storage circuit;

a circuit for comparing the inquired identifier of said setting information with the identifier of another setting information stored in said storage medium; and a circuit for, when said comparison indicates that said setting information is updated, transmitting the updated setting information to said collection circuit.

9. The vehicle-mounted system connected to the control system network in a vehicle according to claim 8, wherein said setting information comprises at least one of an identifier of the setting information, a transmission ID, a reception ID, an ID for identifying the means for obtaining diagnostic information, a period during which diagnostic communication is performed, an importance level of the information to be collected, and a trigger evaluation condition as an attribute.

10. The vehicle-mounted system connected to the control system network in a vehicle according to claim 8, wherein said collection circuit comprising:

a circuit for communicating with an external center;

a circuit for reading said setting information from said storage circuit;

a circuit for detecting an event that communication with said center has been established;

a circuit for making an inquiry to said center about the identifier of said setting information;

a circuit for receiving a message authenticating that it is latest from said center when the identifier of said setting information is latest; and a circuit for receiving the latest said setting information from said center for updating when the identifier of said setting information is not latest.

11. The vehicle-mounted system connected to the control system network in a vehicle according to claim 8, wherein said collection circuit comprising:

a circuit for receiving data having an identifier within a range specified by said setting information out of the data flowing in said control system network;

a circuit for temporarily recording the identifier of said data as a first value;

a circuit for temporarily recording the identifier of the data received within a time limit as a second value;

a circuit for determining the identity of said first value and said second value;

a circuit for increasing a counter value when said values are different; and a circuit for setting the first value to the transmission ID of said setting information and setting the second value to the reception ID when said counter value reaches a specified value or more.

12. The vehicle-mounted system connected to the control system network in a vehicle according to claim 8, wherein said collection circuit comprising:

a circuit for determining whether the data having the same identifier as said transmission ID in said setting information, out of the data flowing in said control system network, is received within a time limit;

a circuit for increasing a counter value when said data is received within the time limit; and a circuit for eliminating a record including said transmission ID from said setting information when said counter value reaches the specified value or more.

13. The vehicle-mounted system connected to the control system network in a vehicle according to claim 8, wherein said diagnostic communication circuit comprises a circuit for transmitting a copy of the collected information, which is stored in said shared storage circuit or said storage medium, to said collection circuit, and wherein said collection circuit comprises a circuit for storing received said copy in said storage circuit.

14. The vehicle-mounted system connected to the control system network in a vehicle according to claim 8, wherein said diagnostic communication circuit comprises a circuit for transmitting a trigger establishment notification message when said trigger evaluation condition set by said setting information has been established.

15. The vehicle-mounted system connected to the control system network in a vehicle according to claim 8, wherein said information collection circuit comprising:

a circuit for receiving said trigger establishment notification message; and a circuit for using the reception of said trigger establishment notification message as a trigger to store the information collected prior to and subsequent to said trigger.

16. The vehicle-mounted system connected to the control system network in a vehicle according to claim 8, wherein said diagnostic communication circuit makes a request to said electronic control units for said diagnostic information based on said setting information in said storage medium via said control system network, and wherein said collection circuit selects said diagnostic information which is requested to said electronic units from said diagnostic communication circuit, out of the information received via said control system network, based on said setting information in said storage circuit.

17. The vehicle-mounted system connected to the control system network in a vehicle according to claim 8, wherein said diagnostic communication circuit has at least one of an excellent heat resistant property, a high vibration resistance, an excellent earthquake resistant property and a long life compared with said collection circuit.

18. The vehicle-mounted system connected to a control system network in a vehicle according to claim 8, wherein the collection circuit is arranged to receive information from the control system network without any transmission of information toward the control system network.

19. A vehicle-mounted system connected to a network for transmitting information between the electronic control units for controlling the vehicle, comprising:

a communication device for communicating with the exterior of a vehicle;

a storage device;

a first arithmetic and control device connected to said communication device, said storage device and said network, for collecting information flowing in said network;

a second arithmetic and control device, provided as a separately operational circuit from said first arithmetic and control device, and connected to said network, for collecting diagnostic information from electronic control units in the vehicle via said network; and a memory that is connected to said first arithmetic and control device and said second arithmetic and control device, and can be accessed from said first arithmetic and control device and said second arithmetic and control device, wherein said memory stores setting information for obtaining predetermined information from said electronic control units;

wherein said second arithmetic and control device makes a request to said electronic control units for said predetermined information based on said setting information in said memory via said network; and wherein said first arithmetic and control device receives said predetermined information from said electronic control units based on said setting information in said memory via said network, and stores said predetermined information in said storage device.

20. The vehicle-mounted system connected to the network for transmitting information between the electronic control units for controlling a vehicle according to claim 19, wherein said first arithmetic and control device, when communicating with an external device via said communication device, requests said external device to update said setting information, and updates said setting information in said memory by the setting information received from said external device.

21. The vehicle-mounted system connected to the network for transmitting information between the electronic control units for controlling a vehicle according to claim 19, wherein said second arithmetic and control device makes a request to said electronic control units for said predetermined information by transmitting a request message including a transmission identifier corresponding to said predetermined information in said setting information via said network, and wherein said first arithmetic and control device receives said predetermined information from said electronic control units via said network by selecting and receiving a reply message including a reception identifier corresponding to said predetermined information in said setting information in said memory.

22. The vehicle-mounted system connected to the network for transmitting information between the electronic control units for controlling the vehicle according to claim 19, wherein said predetermined information in said storage device is used for diagnosing said vehicle.

23. The vehicle-mounted system connected to a control system network in a vehicle according to claim 19, wherein the first arithmetic and control device is arranged to receive information from the network without any transmission of information toward the network.

24. A vehicle that comprises a vehicle-mounted system connected to a network for transmitting information between electronic control units for controlling the vehicle, comprising:

a communication device for communicating with the exterior of a vehicle;

a storage device;

a first arithmetic and control device connected to said communication device, said storage device and said network, for collecting information flowing in said network;

a second arithmetic and control device, provided as a separately operational circuit from said first arithmetic and control device, and connected to said network, for collecting diagnostic information from electronic control units in the vehicle via said network; and a memory that is connected to said first arithmetic and control device and said second arithmetic and control device, and can be accessed from said first arithmetic and control device and said second arithmetic and control device, wherein said memory stores setting information for obtaining predetermined information from said electronic control units;

wherein said second arithmetic and control device makes a request to said electronic control units for said predetermined information based on said setting information in said memory via said network; and wherein said first arithmetic and control device receives said predetermined information from said electronic control units based on said setting information in said memory via said network, and stores said predetermined information in said storage device;

where the vehicle further comprises said electronic control units and said network.

25. The vehicle according to claim 24, wherein the first arithmetic and control device is arranged to receive information from the network without any transmission of information toward the network.

26. A diagnostic information collection device connected to a network for transmitting the information between the electronic control units for controlling a vehicle, comprising:

a processing device for collecting information flowing in said network;

an interface for connecting said processing device to said network; and an interface for connecting said processing device to a memory, wherein an arithmetic and control device, which is connected to a communication device for communicating with the exterior of the vehicle and to a storage, is connected to said network for collecting diagnostic information from electronic control units in the vehicle via said control system network, where said arithmetic and control device is provided as a separately operational circuit from said processing device;

wherein said arithmetic and control device is connected to said memory;

wherein setting information for obtaining predetermined information from said electronic control units is connected to said memory;

wherein said processing device makes a request to said electronic control units for said predetermined information based on said setting information in said memory via said network; and wherein said arithmetic and control device receives said predetermined information from said electronic control units based on said setting information in said memory via said network to store said predetermined information in said storage device.

27. The diagnostic information collection device according to claim 26, wherein the processing device is arranged to receive information from the network without any transmission of information toward the network.

28. A navigation system connected to a network for transmitting information between the electronic control units for controlling a vehicle, comprising:

a processing device for collecting information flowing in said network;

a communication device for communicating with the exterior of a vehicle;

a storage device;

an interface for connecting said processing device to said network; and an interface for connecting said processing device to a memory, wherein setting information for obtaining predetermined information from said electronic control units is stored in said memory;

wherein an arithmetic and control device is connected to said memory and makes an request to said electronic control units for said predetermined information based on said setting information in said memory via said network, where said arithmetic and control device is provided as a separately operational circuit from said processing device; and wherein said processing device receives said predetermined information from said electronic control units based on said setting information in said memory via said network, and stores said predetermined information in said storage device.

29. The navigation system according to claim 28, wherein the processing device is arranged to receive information from the network without any transmission of information toward the network.

* * * * *